Dec. 18, 1934.  F. D. PFENING ET AL  1,984,595
MIXING VALVE
Filed April 6, 1932   2 Sheets-Sheet 1
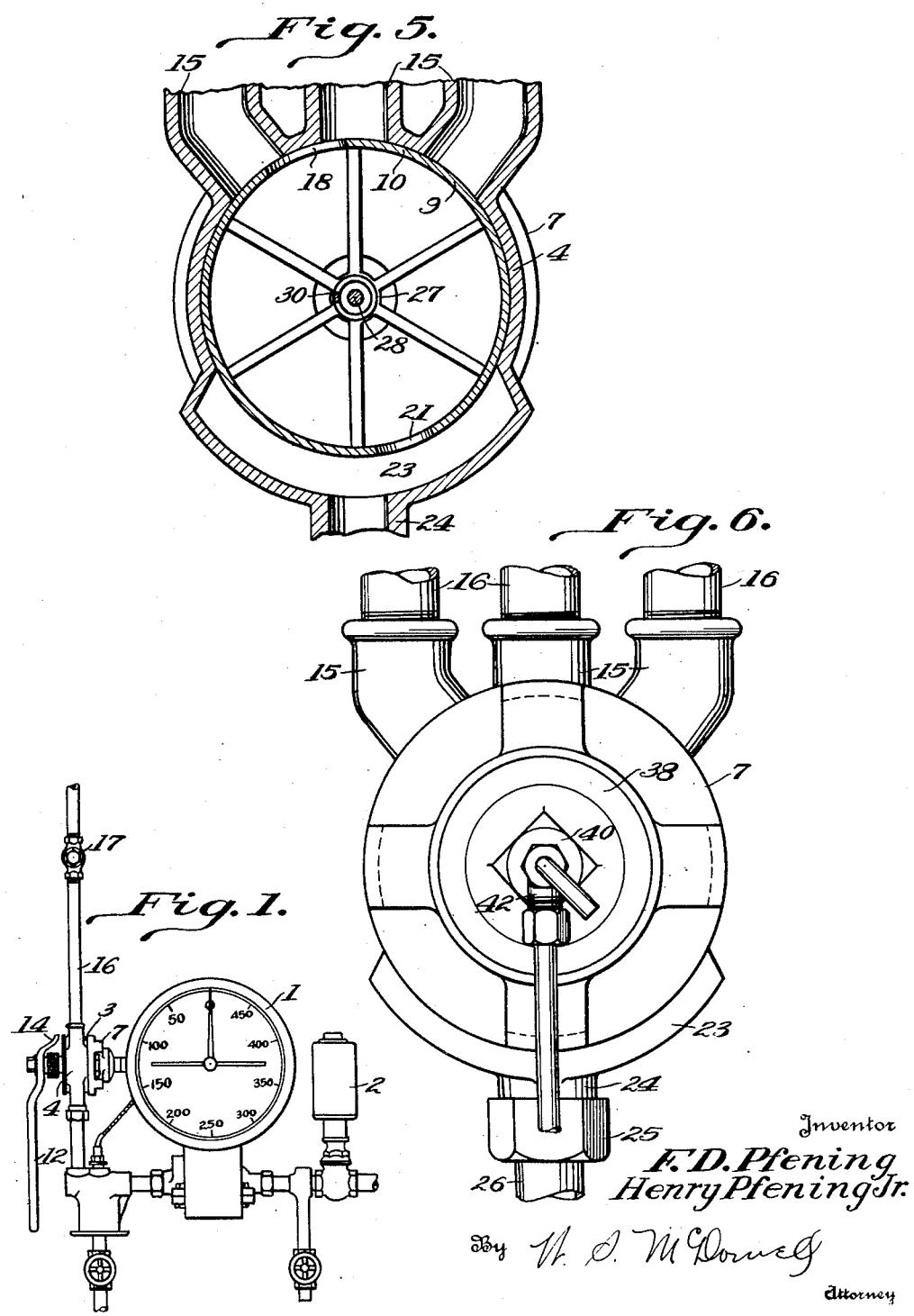
Inventor
F. D. Pfening
Henry Pfening Jr.
By W. S. McDowell
Attorney Dec. 18, 1934.   F. D. PFENING ET AL   1,984,595
MIXING VALVE
Filed April 6, 1932   2 Sheets-Sheet 2
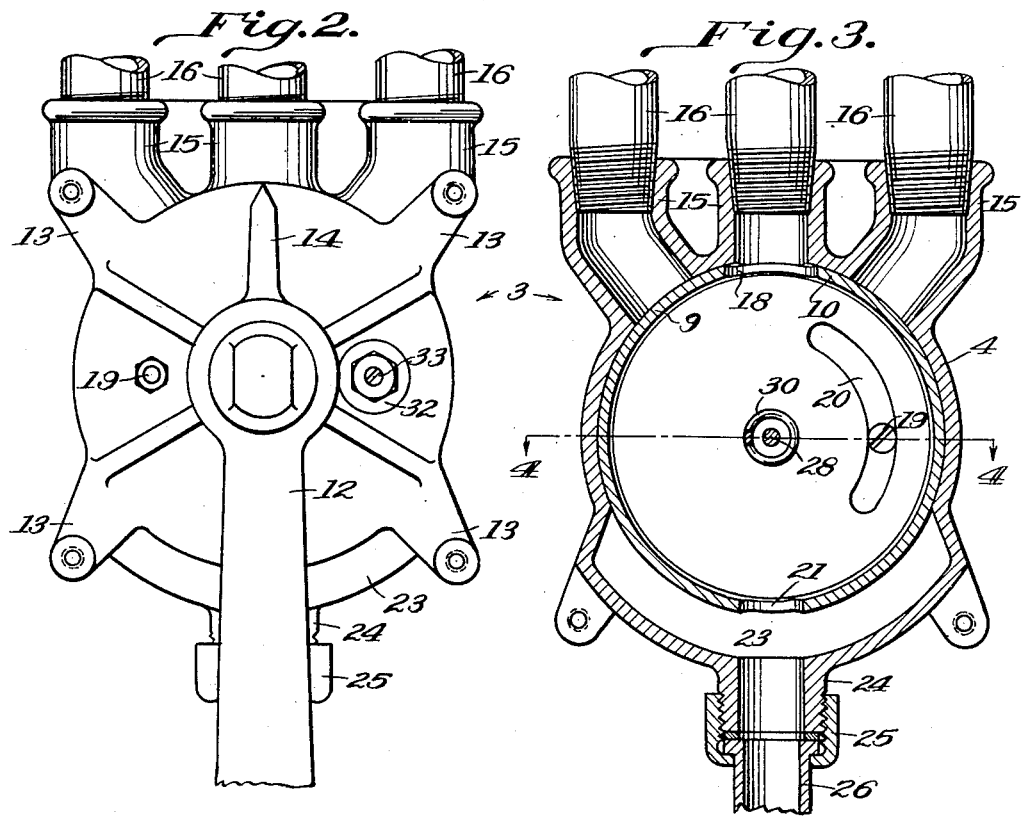
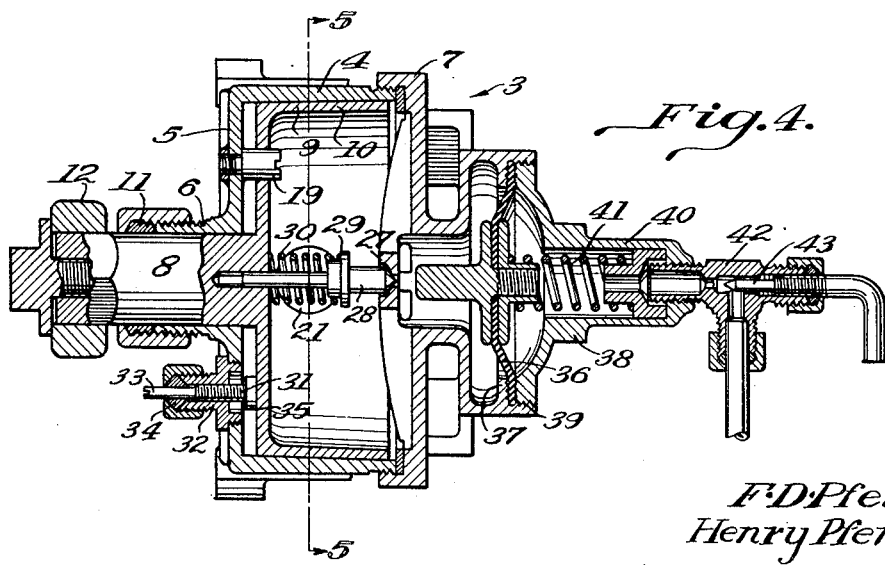
Inventor
F. D. Pfening
Henry Pfening Jr.
By W. I. McDowell
Attorney Patented Dec. 18, 1934

1,984,595

UNITED STATES PATENT OFFICE 1,984,595

MIXING VALVE

Frederic D. Pfening and Henry Pfening, Jr., Columbus, Ohio, assignors to The Fred D. Pfening Company, Columbus, Ohio, a corporation of Ohio Application April 6, 1932, Serial No. 603,591

3 Claims. (Cl. 137—78)

This invention relates to improvements in mixing valves, and has for an object the provision of a mixing valve particularly constructed for the blending or merging of separate streams of liquids possessing different properties or characteristics to the end that the blended stream, issuing from the outlet of the valve may possess certain desired properties or characteristics, our improved valve being especially adapted for the purpose of mixing fluids possessing different temperatures whereby to obtain a desired common temperature or for mixing various kinds of liquids to obtain a mixed liquid wherein the individual ingredients are present in desired proportions.

It is another object of the invention to provide a mixing valve for use in connection with liquid regulating and measuring apparatus of the type disclosed in our co-pending application, Serial No. 480,680 filed September 9, 1930, now Patent 1,876,512, granted September 6, 1932.

In our aforesaid application, liquid measuring apparatus is set forth comprising a flow line in which is situated a flow meter and a normally closed electrically operated valve, the valve being arranged in an electric circuit which is subject to the control of the operation of the flow meter, whereby after a predetermined amount of liquid has passed through the flow meter, control devices are automatically actuated to open the valve circuit whereby to effect the closing of the valve and the arresting of liquid flow through the flow meter and its associated line. Apparatus of this character is used in connection with bakeries where carefully measured quantities of water are required to complete dough forming or mixing operations. Under these conditions, it is often necessary to vary the temperature of the water delivered by the control apparatus. Certain operations demand relatively cool water, others heated water while other operations require water at approximately normal or atmospheric temperatures.

It is therefore another object of the invention to provide a mixing valve arranged contiguous to the inlet side of a flow meter of such a system of liquid measurement providing means for merging refrigerated, heated and normal streams of liquid into a single stream of desired temperature which is passed through and measured by the associated apparatus.

It has been observed in the operation of such systems that when the electrically operated valve on the outlet side of the flow meter is suddenly closed to discontinue water or liquid flow, certain back pressures or reverse surges are created in the liquid supply lines and particularly in the mixing valve casing, whose individual water inlet pipes are equipped with check valves to admit of water flow in but a single direction. These back surges or pressures close the check valves with the result that the pressures are largely absorbed by the casing of the mixing valve and frequently to its injury. It is a further object of the present invention, therefore, to provide means in conjunction with the mixing valve adapted to absorb such back pressures in a simple and convenient manner and to thereby prevent injury to the valve casing and associated parts.

It is a further object of the invention to form a mixing valve for the purpose set forth to include a substantially circular casing having mounted therein a circular valve member, the valve member being provided with a slot capable of registering with any one or two of the water inlet pipes entering the valve casing to secure a blended stream of desired temperature. It is a still further object of the invention to provide means for releasing the rotatable valve member from sticking or clinging engagement with the interior walls of the valve casing, so that the valve member may be rotated fairly and without effort at all times.

For a further understanding of the invention, reference is to be had to the following description and the accompanying drawings, wherein:

Fig. 1 is a view in side elevation disclosing liquid flow apparatus and associated mixing valve as constructed in accordance with the present invention;

Fig. 2 is a view in front elevation of the mixing valve disclosing the operating handle;

Fig. 3 is a vertical sectional view taken through the mixing valve setting forth more particularly the arrangement of the branched inlets and the construction of the rotatable valve member;

Fig. 4 is a horizontal sectional view taken through the mixing valve on the plane indicated by the line 4—4 of Fig. 3;

Fig. 5 is a vertical sectional view on the plane disclosed by the line 5—5 of Fig. 4;

Fig. 6 is a rear elevation of the valve.

Referring more particularly to the drawings, the numeral 1 designates a flow meter which may be of the so-called wabble plate or positive displacement or rotor type commonly employed in the measuring of flowing streams of liquid. The outlet side of the meter is provided with an electrically operated valve 2 which is arranged in an electric circuit (not shown) whereby following the passage of a predetermined amount of liquid through the flow meter, the valve is closed and liquid flow through the meter arrested. The valve 2 is of the normally closed type and when its operating circuit is closed, the solenoid of the valve is energized to effect its opening. The construction of the valve 2 and the means for effecting its automatic operation have been set forth in our above identified application and since the present invention is not concerned with the details thereof, a further description will be accordingly omitted.

On the inlet side of the meter 1, there is arranged a mixing valve 3. This valve is formed to comprise a casing which includes a circular rim 4, an integral front wall 5 and an axial bearing 6. The rim 4 contiguous to its outer edge is threaded for the reception of a closure member 7. The bearing 6 rotatably receives the stud shaft 8 of a circular valve member 9. This valve member includes a rim 10 which closely engages with the tapered inner walls of the casing rim 4. The outer end of the shaft 8, beyond the packed gland 11, provided in connection with the bearing 6, is squared for the reception of the correspondingly formed socketed end of a handle 12, which may be rocked to revolve the valve member within the stationary casing. In this connection, as shown in Fig. 2, the casing is formed with radially extending legs 13 apertured for the reception of fastening devices used in mounting the valve on a suitable base. The upper end of the handle 12 is formed with a pointer 14 by which the temperature of the stream of water or a liquid passing from the valve may be exteriorly indicated, at least in an approximate manner.

As shown in Fig. 3, the upper portion of the rim 4 of the casing has integrally formed therewith nipples 15 which are interiorly threaded for the reception of liquid conducting pipes 16, the said pipes being provided with check valves 17 which limit the direction of flow of the liquid in the valve to but a single general direction. The pipes 16 are employed for conducting liquids of different temperature or other distinguishing properties to the valve. For instance, water passing through one of said pipes may be refrigerated or chilled to subnormal temperatures; the liquid flowing through another of such pipes to normal or atmospheric temperatures, while the liquid flowing through the third of said pipes may be heated to any desired temperature above normal atmospheric temperatures. The rim 10 of the valve member 9 is, as shown in Figs. 3 and 5, provided at its upper portion with a slot or port 18 which is of sufficient length so that it may register with any one of the nipples or liquid inlets 15 of the casing or it may be positioned so that it may register simultaneously with two of such inlets, at full flow, equal to area of any one pipe, thereby providing for the merging of the liquid streams in the valve and a control or regulation of the temperature of the effluent stream. The front wall 5 of the mixing valve carries a fixed pin 19 which is receivable within an arcuate slot 20 formed in the corresponding wall of the valve member, whereby to limit the extent of rotation of the valve member. This permits of full closure of the valve completely obstructing liquid flow therethrough.

The bottom of the rim 10 of the valve member is formed with an outlet port 21 which is arranged in registration with an arcuate outlet chamber 23 provided in the bottom of the valve casing. The latter is formed centrally with a depending branch 24 which receives a threaded coupling sleeve 25 employed in uniting an outlet pipe 26 with the bottom of the valve casing, said pipe 26 leading to the inlet side of the flow meter.

To maintain the valve member in close seating engagement with the internal walls of the valve casing, the closure 7 is provided centrally with a seat 27 in which is positioned one end of a pin 28, the latter being provided with a collar 29 disposed intermediately of its ends. A helical spring 30 engages at one end with the collar 29 and the other end thereof presses against the valve member so that the pressure thereof acts to maintain the tapered rims of the valve member and casing in close engagement. To prevent the valve member from sticking or "freezing" in the casing, it is held on by the provision of a screw 31 which is received within a threaded bushing 32 positioned in connection with the front wall 5 of the valve casing. The operating stem 33 of the screw 31 projects through a packed gland 34 carried by the bushing. By rotating the screw 31 from a position exterior of the valve, the headed end 35 of said screw presses against the valve member, forcing the latter outwardly and holds free from wedging engagement with the adjacent walls of the valve casing, thus permitting the valve member to be freely rotated by the manual actuation of the handle 12.

To absorb without injury back pressures, water hammer or reverse surges set up by the sudden closing of the electro-responsive valve 2 and the closing of the check valve 17, we have provided the closure member 7 of the valve casing with a flexible diaphragm 36. This diaphragm has its peripheral edges clamped in seating engagement with an annular flange 37 by a cage 38 which is threadedly carried as at 39 by the outer end of the closure member. The cage includes a barrel 40 extending axially of the valve assembly, and positioned in this barrel is a helical spring 41 which cooperates with the central portion of the diaphragm to maintain the same normally in a flexed condition disclosed in Fig. 4. In the event of back pressure in the water line associated with the valve casing, such forces are directed upon the diaphragm and resiliently absorbed by said diaphragm and the associated spring 41, thus avoiding injury to the several parts of the valve mechanism. The barrel 40 has associated therewith a ported connection 42 by which air may be admitted into and expelled from the chamber formed between the outer side of the diaphragm 36 and the cage 38. The connection 42 is also equipped with a valve 43 which may be closed in the event the diaphragm becomes broken to prevent water flow through the connection 42.

In view of the foregoing, it will be seen that the present invention provides an efficient readily actuated mixing valve for blending liquids of varying temperature passing under pressure through a confined pipe line system. The construction of the valve is such as to provide for the maintaining of substantially constant or uniform temperatures of the emerging blended stream of liquid. While there has been described what we consider to be the preferred form of the present invention, nevertheless it will be appreciated that we are not limited to the exact details of construction described and illustrated but may employ such variations or modifications thereof as may be said to fall fairly within the scope of the following claims.

What is claimed is:

1. In liquid flow apparatus, in combination, a flow meter, a control valve arranged in the outlet of said meter, a mixing valve communicating with the inlet side of said meter, spaced pipe lines entering said mixing valve to introduce therein liquid streams possessing different temperatures, check valves in said pipe lines limiting the direction of liquid flow therethrough to but a single direction, manually operated means provided in conjunction with said mixing valve for delivering a merged stream of liquid to said flow meter at a desired temperature, and yieldable means formed in conjunction with said mixing valve to compensate for back pressures in said mixing valve produced by the sudden closure of the control valve in the outlet side of the flow meter.

2. In liquid measuring apparatus, in combination, a flow meter, a control valve arranged in the outlet of the flow meter, a mixing valve communicating with the inlet side of said meter, pipe lines for delivering liquids at different temperatures to said mixing valve, check valves operable to admit of liquid flow only from said pipes into said mixing valve, a single outlet connection leading from the mixing valve to said flow meter, and yieldable devices carried in conjunction with said mixing valve to absorb hydraulic back pressures set up in said mixing valve by the sudden closing of the control valve in the outlet side of said flow meter and said check valves.

3. In liquid flow apparatus, a flow meter, a control valve in the outlet side of said meter, a valve governing the inflow of liquid to said meter, means for delivering a liquid under pressure to said inlet valve, a check valve in said last-named means for limiting liquid flow therethrough to a single direction, manually operated means for controlling the operation of the inlet valve, and resilient shock absorbing means carried by said inlet valve and operable to relieve the latter of excessive hydraulic pressures set up by the sudden closing of the control valve in the outlet side of the flow meter and in the check valve.

FREDERIC D. PFENING.
HENRY PFENING, Jr.